H. HORIUCHI.
PIPE COUPLING.
APPLICATION FILED JUNE 7, 1917.

1,363,320.

Patented Dec. 28, 1920.

Witnesses
R. Hosui
K. Hattori

Inventor
Hirosuke Horiuchi

UNITED STATES PATENT OFFICE.

HIROSUKE HORIUCHI, OF TAIHOKUCHO, TAIWAN, JAPAN.

PIPE-COUPLING.

1,363,320.  Specification of Letters Patent.  Patented Dec. 28, 1920.

Application filed June 7, 1917. Serial No. 173,306.

*To all whom it may concern:*

Be it known that I, HIROSUKE HORIUCHI, a subject of the Empire of Japan, residing at 41 2-chome, Tomongai, Taihokujonai, Taihokucho, Taiwan, Japan, have invented certain new and useful Improvements in Pipe-Couplings, of which the following is a specification.

My invention relates to improvements in pipe couplings, in which the outer edges of peripheries of two pipes and the inner edges of flanges or union members are cut off respectively to form an annular slope of 45°, so that when both pipes are united together, an annular groove having square section is formed in the united face, and a packing ring having circular section is inserted in the said groove.

The object of the invention is to perfectly prevent the leakage of the pipes at their joints by a single packing ring only.

Figure 3:
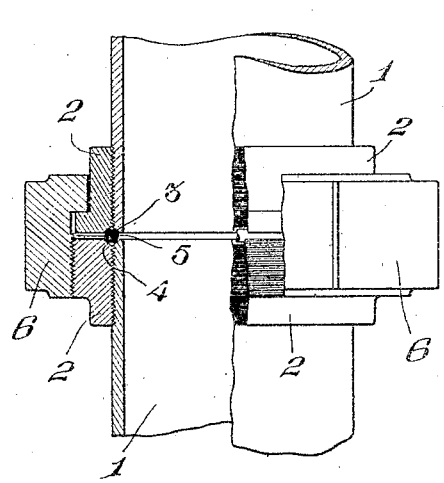
Figure 1:
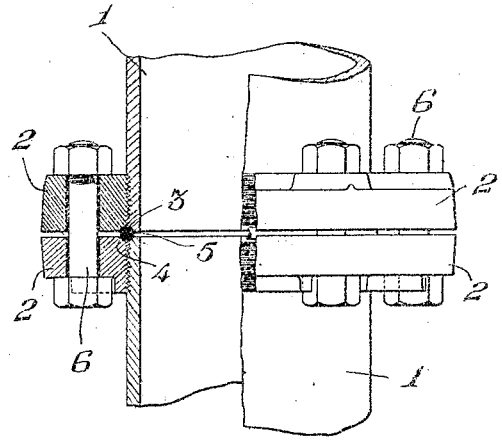
Figure 4:
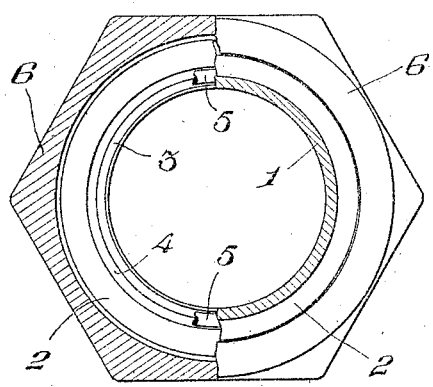
Figure 2:
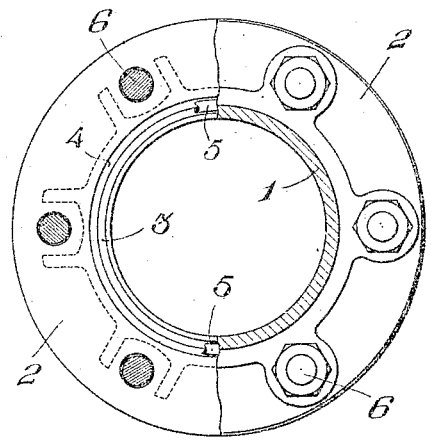

In the annexed drawings, Figure 1 shows a longitudinal section in the case of a flange coupling, Fig. 2 shows its cross section, and Fig. 3 and Fig. 4 show respectively the corresponding sections in the case of a union coupling.

In my invention, the outer edges of peripheries of the pipes 1, 1 and the inner edges of peripheries of the flanges 2, 2 (Figs. 1 and 2) or the union members 2, 2 (Figs. 3 and 4) are respectively cut off into annular slopes 3 and 4 of 45°, so that when the flanges or union members are screwed up to the ends of the pipes, annular V-grooves are formed in the end faces of the screwed parts, and when the two pipes are united together, an annular groove having square section is formed in their united face, and a packing ring 5 having circular section, made of india-rubber or other elastic and impervious material, is inserted in the said groove, and then bolts 6 (Figs. 1 and 2) in the case of flange coupling, or a nut 6 (Figs. 3 and 4) in the case of union coupling being applied as in ordinary couplings, the close connection is brought on.

As shown in Fig. 3, the upper flange 2 is provided with an outward extending ledge 2ª, and the nut 6 has an inwardly extending flange 6ª, which overlies the flange 2ª, so that in screwing the nut 6 on to the lower flange 2, the ledges will coöperate to move the pipes and flanges together evenly, whereby the pressure on the ring 5 will be evenly distributed throughout its extent. The advantages of such a construction will be apparent to those skilled in the art.

So, in this invention, the packing ring, when the bolts are or nut is screwed up, is so compressed that it exactly fits in V-grooves, so that its periphery is thus gradually brought to close contact with all the inner surface of the annular square groove, and the four joints at its periphery are simultaneously closed up by a single packing ring.

By making the ring 5 of circular cross-section and inserting the same in a practically square recess, it will be seen that in compressing the ring, the straight surfaces of the grooves 3 and 4 will engage the cross-section circumference of the ring at four points, and as the parts move toward one another, the ring 5 will be simultaneously forced against the threads connecting the flanges and pipes, outwardly between the flanges, and inwardly between the ends of the pipes.

In pipe couplings of the sort, a simple system in which only a packing ring is used between flanges or union members, requires soldering or some other methods in the screwed portions in order to prevent the leakage in the axial direction, and various other systems patented hitherto being provided with two separate means, one for preventing the leakage in the radial direction and the other for preventing it in the axial direction, they are so far complicated in construction and requires comparatively a strong power for screwing up the bolts or nut.

It is also apparent that when desired the flange or union members 2, 2 may be adjusted so that the adjacent faces thereof will be positioned slightly beyond the adjacent edges of the pipe 1 on which they are mounted. By this arrangement when a packing ring 5 is arranged in the grooves owing to the fact that the sloping or beveled faces 4 of the members 2 first engage the ring, the latter will be pressed and tightly maintained against the sloping or beveled faces 3 and if desired may be even compressed slightly within the space between the pipes 1 thereby forming an effective joint.

In short, all the known systems of pipe couplings are imperfect for bringing the jointed parts to close contact, and are, also, very troublesome in fitting them up. The present invention, however, is very simple in construction and requires no trouble in fitting it up, and perfectly prevents the leakage both in the axial and radial directions by a single packing ring only.

What I claim and desire to secure by Letters Patent is:

In a pipe coupling, the combination with pipes having the outer surface near the outer ends threaded and having the outer edges of their outer ends beveled rearwardly, of interiorly threaded flanges adjustably engaged on the threaded portions of the pipes and having their inner edges beveled correspondingly rearwardly for coöperating with the beveled edges of the pipes to form substantially V shaped annular grooves, a resilient packing ring circular in cross section located in said grooves and spacing the grooves apart and means engaging the flanges for clamping the flanges and pipes together subsequent to the adjustment of the flanges on the pipes to, in consequence, force the ring inwardly between the pipes thereby providing an effective joint.

In testimony whereof I affix my signature in presence of two witnesses.

HIROSUKE HORIUCHI

Witnesses:
 R. HOSUI,
 K. HATTORI.